United States Patent [19]

Boaz

[11] Patent Number: 5,120,570
[45] Date of Patent: Jun. 9, 1992

[54] PROCESS FOR APPLYING CERAMIC PAINT TO A SURFACE OF A GLASS SHEET

[75] Inventor: Premakaran T. Boaz, Livonia, Mich.

[73] Assignee: Ford Motor Company, Dearborn, Mich.

[21] Appl. No.: 625,251

[22] Filed: Dec. 10, 1990

[51] Int. Cl.⁵ ............................................. B05D 3/02
[52] U.S. Cl. .................................. 427/45.1; 427/282; 427/375; 427/376.1; 427/376.2; 427/419.2; 427/419.3; 65/60.2; 65/60.5; 65/DIG. 4
[58] Field of Search .................... 427/45.1, 282, 419.2, 427/419.3, 375, 376.1, 376.2, 165; 65/60.2, 60.5, DIG. 4

[56] References Cited

U.S. PATENT DOCUMENTS

| | | | |
|---|---|---|---|
| 3,472,200 | 10/1969 | Gerling | 118/665 |
| 4,765,773 | 8/1988 | Hopkins | 404/94 |
| 4,770,685 | 9/1988 | Boaz | 65/106 |
| 5,037,783 | 8/1991 | Boaz | 501/19 |

OTHER PUBLICATIONS

Johnson et al., "Synthesis of High-Molecular Weight Polymers by Microwave Radiation", IBM Technical Disclosure Bulletin, vol. 18, No. 1, Jun. 1975, p. 221.

Primary Examiner—Michael Lusignan
Assistant Examiner—Roy V. King
Attorney, Agent, or Firm—Charles H. Ellerbrock; Roger L. May

[57] ABSTRACT

Layers of ceramic paint are applied to a surface of a glass sheet in a process wherein each layer of paint is dried by microwave energy before a successive layer of ceramic paint is applied thereover.

9 Claims, No Drawings

PROCESS FOR APPLYING CERAMIC PAINT TO A SURFACE OF A GLASS SHEET

FIELD OF THE INVENTION

The present invention is directed to a process for applying ceramic paint to a surface of a glass sheet. More particularly, the invention contemplates a process for applying successive layers of ceramic paint to the glass sheet, including a method for quickly and efficiently drying each layer before the subsequent layer is deposited, without heating the associated glass sheet.

BACKGROUND OF THE INVENTION

Ceramic paint compositions are generally known to those ordinarily skilled in the art of applying ceramic paints to automotive and architectural glazings. Such ceramic paints are used, for example, to form opaque borders around the peripheral marginal surfaces of glazings used as windshields, sidelites, and backlites of motor vehicles. Frequently such paints are applied in successive layers in order to increase the thickness of the ultimately fired ceramic paint coating; provide an outer, exposed layer which will not adhere to the forming surface of a press bending mold; provide multi-colored decorative surface treatments; etc.

Ceramic paints or pastes generally contain a mixture of metal oxides which together act as a coloring agent. The metal oxides are non-reactive with one another, as well as non-reactive with other compounds contained in the ceramic paint or the glass to which the ceramic paint is applied, at temperatures up to about 1,300° F. The mixture of metal oxides may be adjusted so as to achieve a specific color for the ultimately produced fired ceramic paint. For example, the opaque peripheral marginal paint bands fired onto automotive glazings are generally black.

Additionally, the ceramic paints generally known in the art contain one or more low melting glass frits, which melt at temperatures below 1,300° F. These low melting glass frits are the materials which ultimately fuse the ceramic paint together, and to the glass sheet, to insure that the ceramic paint remains affixed to the glass sheet after being cooled to room temperature.

A vehicle is also generally mixed with the metal oxides and glass frit, to allow the ceramic paint to be applied to the surface of the glass sheet by conventional paint application processes. Generally, organic vehicles, e.g., pine oil, mineral oils, low molecular weight petroleum fractions, and the like, are used to allow the ceramic paint to be applied to the glass surface by brushing, spreading, or screen printing.

When multiple layers of ceramic paint are to be applied to the surface of a glass sheet, the process for doing so is known to be time consuming and wasteful of energy. A previously applied layer of ceramic paint must be dried before a successive layer of ceramic paint may be deposited thereover. Generally this drying process is accomplished by heating the glass sheet having the previously applied layer of ceramic paint thereon. The thermal energy, which is generally supplied by infrared radiant sources or direct fired heaters, is effective to both heat the glass sheet and volatize the organic vehicle from the paint, causing it to dry. Thereafter, the glass sheet having the dried layer of ceramic paint thereon must be cooled before a successive layer of ceramic paint may be deposited thereover. This cooling process generally involves the use of air blowers to remove heat from both the ceramic paint and the glass sheet by convective heat transfer. The finally applied layer of ceramic paint is generally not subjected to the known heating-then-cooling process. Instead, the glass sheet having the layer or layers of dried ceramic paint and the outer, exposed layer of undried ceramic paint thereon is conveyed through a heating chamber where the layers of ceramic paint are devitrified and "fired" onto the surface of the glass sheet.

Clearly, the steps of heating-then-cooling the glass sheet between successive applications of ceramic paint, in order to dry the previously applied layer of ceramic paint, add significant costs and time to the manufacture of glass sheets having multiple layers of ceramic paint thereon.

By way of example, U.S. Pat. No. 4,770,685 to Boaz discloses a method for manufacturing a formed glass sheet with paint thereon, wherein a layer of ceramic paint having a non-stick characteristic is deposited over an initial layer of ceramic paint which does not possess such a quality. It is disclosed that the initial layer of ceramic paint is dried by heating the glass sheet before the second non-stick layer of ceramic paint is applied thereover. This procedure, of course, requires energy and time for heating-then-cooling the glass sheet between the applications of the first and second layers of ceramic paint.

The need to dry ceramic paint layers exists, of course, only when dealing with ceramic paints having liquid vehicles which must be volatilized to solidify the paint. In an effort to eliminate the heating-then-cooling process required for the application of successive ceramic paint layers, other more expensive ceramic paints have been developed. For example, U.S. Pat. No. 4,684,389 to Boaz discloses a UV-based ceramic paint composition. Such a paint composition applied to the surface of a glass sheet may be "cured" by ultraviolet radiation prior to the application of a second layer of ceramic paint. It is also known to apply a hot-melt ceramic paint to the surface of a glass sheet. Such a paint "freezes" to the surface of the glass sheet, allowing the immediate application of a successive layer of ceramic paint thereover. Thus, efforts to eliminate the heating-then-cooling steps required for the application of successive layers of ceramic paints to a glass sheet have been directed toward eliminating the use of a liquid volatile vehicle in the ceramic paint compositions. Despite the knowledge of methods for quickly heating liquid materials, a process for quickly heating ceramic paint compositions containing volatile liquid vehicles, which process does not require a subsequent cooling step to cool the hot glass sheet, has not heretofore been discovered.

U.S. Pat. Nos. 3,472,200 to Gerling and 4,765,773 to Hopkins disclose apparatus and a method for applying and quickly drying highway-marking paint using microwave energy, so that motor vehicles may drive over the painted surface immediately after it is formed. The patents do not suggest the application of multiple layers of paint, nor the use of such a process in conjunction with ceramic paint layers applied to glass sheets.

It must be noted that the prior art referred to hereinabove has been collected and examined only in light of the present invention as a guide. It is not to be inferred that such diverse art would otherwise be assembled absent the motivation provided by the present invention, nor that the prior art when considered in combination suggests the present invention absent the teachings herein.

It would be desireable to develop a process for applying successive layers of ceramic paint to a surface of a glass sheet, wherein the time and energy required for drying the paint layers between successive applications thereof would be minimized.

SUMMARY OF THE INVENTION

Accordant with the present invention, a process for applying a fired ceramic paint coating to a surface of a glass sheet has surprisingly been discovered. The inventive process comprises the steps of applying a layer of ceramic paint to at least a portion of the surface of the glass sheet; heating the ceramic paint without heating the glass sheet, by directing microwave energy onto the ceramic paint, to dry the ceramic paint; cooling the ceramic paint by conducting heat energy from the ceramic paint to the glass sheet; applying a successive layer of ceramic paint to at least a portion of the previously dried layer of ceramic paint; and heating the glass sheet having the ceramic paint coating thereon, to devitrify and simultaneously fuse the ceramic paint together and to the glass sheet. Optionally, steps B, C, and D may be repeated any number of times sufficient to prepare a desired ceramic paint coating comprising multiple layers of ceramic paint.

The ceramic paint for use according to the present invention must contain a vehicle component which is responsive to microwave energy. Suitable microwave responsive vehicle components include Polar liquids such as water.

The present process is particularly useful for preparing automotive and architectural glazings having opaque concealment bands on the peripheral marginal surfaces thereof.

DETAILED DESCRIPTION OF THE PREFERRED EMBODIMENT

The present invention is directed to a process for applying ceramic paint to a surface of a glass sheet, wherein the ceramic paint is deposited as successive layers and each layer is dried by microwave energy before the next layer is deposited thereover. The glass sheet having the layers of ceramic paint thereon is thereafter heated to fire the ceramic paint onto the glass sheet. This process eliminates the steps of heating the glass sheet to drive off the ceramic paint volatile components and thereafter cooling the glass sheet so that the next layer of ceramic paint may be applied. The glass sheet possesses a high thermal inertia due to the high heat capacity of glass. Therefore, the conventional process of heating-then-cooling the glass sheet would require a significant amount of energy and a substantial period of time, in contrast to the drying process of the present invention.

The ceramic paints suitable for use according to the present invention include any ceramic paints which are responsive to microwave energy. By the term "responsive to microwave energy" is meant that the temperature of the paint increases upon exposure to microwave energy. Such paints generally comprise glass frit, a pigment, and a microwave responsive vehicle.

Suitable glass frits according to the present invention include one or more glass frits prepared from conventional lead borosilicate glass compositions that are high in lead content. Alternatively, the frit may comprise a combination of metal oxides such as those selected from the oxides of zinc, bismuth, lead, titanium, zirconium, sodium, boron, lithium, potassium, calcium, aluminum, tin, vanadium, molybdenum, magnesium, iron, manganese, and the like. The frit is prepared by melting the frit batch ingredients at temperatures from about 1650° F. to about 2,900° F., and then quenching the molten frit composition either with a stream of water or by pouring the melt between cooled metal rolls rotating in opposite direction. The resulting chunks of frit are then ground into fine particles so as to pass through a 325 U.S. Standard Sieve mesh screen. A lead borosilicate glass frit high in lead content is preferred because it is readily available and relatively inexpensive. The frit is generally added to the ceramic paint composition at a concentration from about 20% to about 60% by weight. Preferably, the concentration of glass frit in the ceramic paint composition is from about 30% to about 50% by weight.

Pigments for use according to the present invention generally comprises mixtures of metal oxides which together act as a coloring agent for the ceramic paint. These metal oxides include, but are not necessarily limited to, oxides of chromium, cobalt, nickel, manganese, iron, or copper. Mixtures of these metal oxides form various colors, as is well known in the art of glass making. A particularly useful mixture of metal oxides for applying a ceramic paint concealment band to a peripheral marginal surface of an automotive glazing is conventionally known in the art as black oxide powder. The metal oxide pigments are non-reactive with one another, as well as non-reactive with other compounds contained in the ceramic paint or the glass to which the ceramic paint is applied, up to temperatures of about 1,300° F. The concentration of pigment in the ceramic paint composition generally may be from about 5% to about 30% by weight. Preferably, the concentration is from about 10% to about 20% by weight of the ceramic paint composition.

Vehicles suitable for use in the ceramic paint compositions of the present invention generally comprise organic materials which allow the ceramic paint composition to flow at application temperatures. Thus, the ceramic paint composition may be applied to the surface of the glass sheet by any conventional paint application process such as, for example, brushing, spreading, or screen printing. Examples of useful vehicles include pine oil, vegetable oils, mineral oils, low molecular weight petroleum fractions, vinyl resins, thermoplastic resins, polyolefins, solvents, and the like. Additionally, the vehicle must contain a material which is responsive to microwave energy. These include liquids containing polar molecules, wherein the positive and negative electrical charges are permanently separated, as opposed to nonpolar molecules in which the charges coincide. Such polar liquids include, but are not necessarily limited to water, alcohols such as, for example, methanol, ethanol, n-propanol, isopropanol, and n-butanol, isophorone, benzophenone, x-chloronaphthalene, diphenylsulfone, 2-phenylphenol, p-methoxyphenol, 2-methoxyhaphthalene, ethyl-4-hydroxybenzoate, N-cyclohexyl-2-pyrrolidone, pentafluorophenol, dimethylphthalate, and phenylbenzoate, as well as mixtures thereof. A preferred polar liquid is water. The polar liquid may be included in the paint composition at a concentration from about 0.1% to about 10% by weight. Preferably, the polar liquid comprises from about 1% to about 5% by weight of the ceramic paint composition.

Conventional adjuvants such as, for example, fillers, thermal stabilizers, ultraviolet energy absorbers, and the like, may be included in the ceramic paint composition at a concentration generally not exceeding about 50% by weight. Also, a metal powder may be added to the ceramic paint composition to prevent adhesion of the paint to the surface of a glass sheet bending mold in a subsequent forming operation or to provide an electrically conductive coating on the glass sheet. Such metal powders include, but are not necessarily limited to zinc, silver, aluminum, tin, copper, iron, lead, titanium, zirconium, and the like, as well as mixtures and alloys thereof. The use of metal powders in ceramic paint compositions is more fully set forth in U.S. Pat. Nos. 4,684,389 to Boaz, which is incorporated herein in its entirety by reference thereto.

The glass sheets upon which the layers of ceramic paint are to be deposited may be prepared from any of the types of glass generally known in the art of glass making. Typical glass sheets contemplated for use according to the present invention are soda-lime-silica automotive and architectural glazings, generally produced by the well-known float glass process. However, ceramic paint may be applied to the surface of any type of glass sheet by the process of the present invention.

In operation, a first layer of ceramic paint is applied to at least a portion of the surface of the glass sheet by a conventional paint application method, e.g., screen printing wherein the ceramic paint is spread across the screen by a squeegee to force the paint through the screen pattern onto the glass sheet.

The first layer of ceramic paint is thereafter dried utilizing microwave energy directed onto the ceramic paint layer. This may be achieved by conveying the glass sheet having the first layer of ceramic paint thereon past a microwave radiation source or waveguide. The ceramic paint is responsive to the microwave energy, and increases in temperature to a point where at least a portion of the vehicle is volatilized, thereby causing the paint to dry. Typically, the microwave energy causes the ceramic paint to rise to a temperature from about 200° F. to about 350° F. The paint solidifies and adheres to the surface of the glass sheet to give a sharp image which is resistant to smudging during subsequent handling and paint application steps. Microwave energy causes the polar molecules contained in the ceramic paint vehicle to rotate millions of times per second, resulting in internal friction which heats the ceramic paint. A particularly useful microwave energy source is the Macrowave Model 7500 50 kw waveguide manufactured by Radio Frequency Co. of Millis, Mass. Thereafter, the ceramic paint immediately cools by the conductive transfer of heat energy from the hot ceramic paint to the relatively cool glass sheet.

This method for drying the first layer of ceramic paint is particularly advantageous over the prior art, because the glass sheet is unaffected by the microwave energy. Moreover, the glass sheet actually performs as a heat-sink, to cool the ceramic paint when the application of microwave energy to the ceramic paint ceases. Therefore, a successive layer of paint may immediately be applied to the dried first layer of ceramic paint, although a time delay between the drying of the first layer and the application of the successive layer is also contemplated by the present invention.

Following the step of drying the first layer of ceramic paint, a subsequent layer of the same or a different ceramic paint may be applied over at least a portion of the first layer of ceramic paint by a conventional paint application method such as, for example, screen printing. Such a second layer of ceramic paint may inter alia be required to increase the thickness (over that achievable using a single screen printing operation) of the ultimately fired ceramic paint coating, or to provide an outer, exposed layer of ceramic paint which contains additives that prevent adhesion of the paint to a press bending mold surface during a subsequent glass sheet forming operation, or to form a busbar or other electrically conductive layer over a previously applied concealment band for an automotive glazing, or simply to produce a multi-colored decorative surface treatment for the glass sheet.

Finally, the glass sheet having the ceramic paint coating comprising the dried first layer of ceramic paint and the undried second layer of ceramic paint may be heated to a temperature and for a time sufficient to cause the ceramic paint to devitrify and simultaneously fuse together and to the glass sheet. The temperature required for such a process is generally from about 900° F. to about 1,100° F. The time required for devitrification and fusion is generally from about 1 to about 5 minutes. Preferably, the time is from about 2 to about 3 minutes. During this process step, the ceramic paint is heated to a temperature so as to devitrify the glass frit, converting it to a crystalline or semicrystalline phase characterized by a glassy matrix. Simultaneously, the glass frit fuses together and to the glass sheet. The temperature required for devitrifying and fusing the ceramic paint is lower than the softening point of the glass sheet, yet is high enough to allow for bakeout or volitization of the vehicle contained in the ceramic paint. Generally, the heating process is accomplished by passing the glass sheet through a heating chamber, tempering furnace, or glass sheet forming lehr.

As is readily apparent from the nature of the inventive process, any number of successive layers of ceramic paint may be applied then dried before a final layer of ceramic paint is applied, to form the desired ceramic paint coating. Thus, for example, a ceramic paint coating comprising three layers of paint may be prepared by applying then microwave drying the first and second layers, and finally applying the third layer of ceramic paint.

The process for applying ceramic paint to the surface of the glass sheet according to the present invention is particularly useful for preparing automotive glazings having a concealment band positioned on a peripheral marginal surface thereof. Such concealment bands are well known in the art of automotive glazings as useful for preventing the degradation of adhesives used to mount the glazing in a vehicle opening as a result of exposure to solar radiation, and for concealing attachment hardware and structural components which lie below the edges of the glazing. The band generally extends to the edges of the glazing, and has a width sufficient to conceal the underlying adhesive and structural components, but which is sufficiently narrow to provide maximum vision to occupants of the vehicle. It is known to apply such a band to the surface of an automotive glazing by silk screening the layers of ceramic paint onto the glazing and thereafter firing the ceramic paint. Such a method is more fully set forth in U.S. Pat. No. 4,770,685 to Boaz, which is incorporated herein in its entirety by references thereto. The inventive process may likewise be used to apply an electrically conductive ceramic paint over a portion of a previously applied concealment band. Clearly, other ceramic paint patterns may be prepared by applying various ceramic paint coatings to glass surfaces, depending upon the ultimate purpose for the fired ceramic paint coating.

From the foregoing description, one skilled in the art can easily ascertain the essential characteristics of this invention, and without departing from its spirit and scope, can make various changes and modifications in the invention to adapt it to various usages and conditions.

What is claimed is:

1. A process for applying a fired ceramic paint coating to a surface of a glass sheet, comprising the steps of:
   A) applying a layer of ceramic paint to at least a portion of the surface of the glass sheet;
   B) heating the ceramic paint without heating the glass sheet, by directing microwave energy onto the ceramic paint, to dry the ceramic paint;
   C) cooling the ceramic paint by conducting heat energy from the ceramic paint to the glass sheet;
   D) applying a successive layer of ceramic paint to at least a portion of the previously dried layer of ceramic paint; and
   E) heating the glass sheet having the ceramic paint coating thereon, to devitrify and simultaneously fuse the ceramic paint together and to the glass sheet.

2. The process for applying a fired ceramic paint coating to a surface of a glass sheet according to claim 1, wherein steps B, C, and D are repeated a number of times sufficient to prepare a desired ceramic paint coating comprising multiple layers of ceramic paint.

3. The process for applying a fired ceramic paint coating to a surface of a glass sheet according to claim 1, wherein the layers of ceramic paint are applied by screen printing.

4. The process for applying a fired ceramic paint coating to a surface of a glass sheet according to claim 1, wherein the ceramic paint comprises a vehicle including a microwave responsive component selected from the group consisting of water, alcohols, isophorone, benzophenone, x-chloronaphthalene, diphenylsulfone, 2-phenylphenol, p-methoxyphenol, 2-methoxyhaphthalene, ethyl-4-hydroxybenzoate, N-cyclohexyl-2-pyrrolidone, pentafluorophenol, dimethylphthalate, and phenylbenzoate, and mixtures thereof.

5. The process for applying a fired ceramic paint coating to a surface of a glass sheet according to claim 4, wherein the microwave responsive component comprises water.

6. The process for applying a fired ceramic paint coating to a surface of a glass sheet according to claim 1, wherein the ceramic paint includes a polar liquid at a concentration from about 1% to about 5% by weight.

7. The process for applying a fired ceramic paint coating to a surface of a glass sheet according to claim 1, wherein the glass sheet comprises a glazing for automotive or architectural use.

8. A process for applying a fired ceramic paint coating to a surface of a glass sheet, comprising the steps of:
   A) applying by screen printing a layer of ceramic paint to at least a portion of the surface of the glass sheet, said ceramic paint including from about 1% to about 5% by weight water;
   B) heating the ceramic paint without heating the glass sheet by directing microwave energy onto the ceramic paint, to dry the ceramic paint;
   C) cooling the ceramic paint by conducting heat energy from the ceramic paint to the glass sheet;
   D) applying by screen Printing a successive layer of ceramic paint to at least a portion of the previously dried ceramic paint, said successive layer of ceramic paint including from about 1% to about 5% by weight water; and
   E) heating the glass sheet having the ceramic paint coating thereon, to devitrify and simultaneously fuse the ceramic paint together and to the glass sheet.

9. The process for applying a fired ceramic paint coating to a surface of a glass sheet according to claim 8, wherein steps B, C, and D are repeated a number of times sufficient to prepare a desired ceramic paint coating comprising multiple layers of ceramic paint.

* * * * *